(12) United States Patent
Peng et al.

(10) Patent No.: US 11,901,820 B2
(45) Date of Patent: Feb. 13, 2024

(54) POWER SUPPLY APPARATUS WITH STEP-UP AND STEP-DOWN CONVERSION

(71) Applicant: CHICONY POWER TECHNOLOGY CO., LTD., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 99 days.

(21) Appl. No.: 17/710,066

(22) Filed: Mar. 31, 2022

(65) Prior Publication Data

US 2022/0360175 A1 Nov. 10, 2022

(30) Foreign Application Priority Data

May 7, 2021 (TW) .................................. 110116474
Dec. 3, 2021 (TW) .................................. 110145235

(51) Int. Cl.
*H02M 3/158* (2006.01)
*H02M 1/00* (2006.01)

(52) U.S. Cl.
CPC ....... *H02M 3/1582* (2013.01); *H02M 1/0003* (2021.05); *H02M 1/0048* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS

| 6,804,129 B2 | 10/2004 | Lin |
| 8,027,175 B2 * | 9/2011 | Liu .................. H02M 3/33507 363/16 |

(Continued)

FOREIGN PATENT DOCUMENTS

| CN | 104467443 A | 3/2015 |
| CN | 106655771 A | 5/2017 |

(Continued)

*Primary Examiner* — Thienvu V Tran
*Assistant Examiner* — Nusrat Quddus
(74) *Attorney, Agent, or Firm* — MUNCY, GEISSLER, OLDS & LOWE, P.C.

(57) ABSTRACT

A power supply apparatus with step-up and step-down conversion includes a primary-side rectifying/filtering circuit, a step-up converter, a full-bridge LLC converter, a primary-side controller, a secondary-side rectifying/filtering circuit, a voltage regulator, and a secondary-side controller. The primary-side rectifying/filtering circuit rectifies and filters an AC input voltage into a DC input voltage. The primary-side controller controls the step-up converter to step up the DC input voltage to a step-up voltage, and controls the full-bridge LLC converter to convert the step-up voltage to a conversion voltage. The secondary-side rectifying/filtering circuit rectifies and filters the conversion voltage into a DC output voltage. The secondary-side controller controls the primary-side controller to provide the step-up control signal and the conversion control signal and provides a voltage regulation signal to control the voltage regulator so as to regulate the DC output voltage to an output voltage for supplying power to the load.

17 Claims, 5 Drawing Sheets

(58) Field of Classification Search
CPC .............. H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 1/12; H02M 3/3155; H02M 7/1557; H02M 7/1626; H02M 7/12; H02M 7/219; H02M 7/151; H02M 5/4585; H02M 7/1552; H02M 7/1623; H02M 3/10; H02M 3/135; H02M 3/137; H02M 7/00; H02M 7/064; H02M 7/519; H02M 7/521; H02M 7/523; H02M 7/757; H02M 7/7575; H02M 7/66; H02M 7/68; H02M 7/72; H02M 2007/4835; H02M 7/487; H02M 7/515; H02M 7/525; H02M 7/527; H02M 7/529; H02M 7/539; H02M 1/32; H02M 2001/322; H02M 2001/327; H02M 1/34; H02M 2001/342; H02M 2001/344; H02M 2001/346; H02M 2001/348; H02M 1/38; Y02B 70/1491; H02J 3/46; H02J 3/38; H02J 7/12; G05F 1/30; G05F 1/33; G05F 1/32; G05F 1/34; G05F 1/38; G05F 1/52; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17

See application file for complete search history.

(56) References Cited

U.S. PATENT DOCUMENTS

| | | | |
|---|---|---|---|
| 9,263,960 | B2 | 2/2016 | Jovanovic et al. |
| 9,906,150 | B1 * | 2/2018 | Xie .................. H02M 1/08 |
| 10,389,233 | B1 | 8/2019 | Lim |
| 11,206,727 | B1 * | 12/2021 | Palliyil Chundethodiyil .............. H05B 45/34 |
| 11,817,788 | B1 * | 11/2023 | Peng .................. H02M 3/33571 |
| 2006/0133119 | A1 | 6/2006 | Nomura et al. |
| 2009/0290385 | A1 * | 11/2009 | Jungreis ............... H02M 1/4241 363/126 |
| 2012/0223980 | A1 * | 9/2012 | Hollevoet ............ H03F 1/0227 363/21.01 |
| 2013/0250627 | A1 * | 9/2013 | Herfurth ............. H02M 3/3376 363/21.15 |
| 2014/0313784 | A1 * | 10/2014 | Strzalkowski .... H02M 3/33584 363/17 |
| 2015/0098254 | A1 * | 4/2015 | Brinlee ............... H02M 3/3376 363/21.02 |
| 2015/0138856 | A1 | 5/2015 | Huynh et al. |
| 2015/0162840 | A1 | 6/2015 | Frost et al. |
| 2015/0229225 | A1 | 8/2015 | Jang et al. |
| 2022/0368238 | A1 * | 11/2022 | Liu ........................ H02M 3/01 |

FOREIGN PATENT DOCUMENTS

| | | | | |
|---|---|---|---|---|
| CN | 108258910 | A | 7/2018 | |
| CN | 108964466 | A | 12/2018 | |
| CN | 110504847 | A | 11/2019 | |
| CN | 113224941 | A | 8/2021 | |
| DE | 102012201642 | A1 * | 8/2013 | ............ H02M 3/335 |
| EP | 2166821 | A2 * | 3/2010 | ............ H02M 3/335 |
| EP | 3796533 | A1 * | 3/2021 | ............... G06F 1/26 |
| TW | 201027892 | A | 7/2010 | |
| TW | 201937329 | A | 9/2019 | |
| TW | I670919 | B | 9/2019 | |
| TW | 202133537 | A | 9/2021 | |
| TW | I750780 | B | 12/2021 | |
| WO | WO-2009128373 | A1 * | 10/2009 | ........ H02M 3/33584 |

* cited by examiner

POWER SUPPLY APPARATUS WITH STEP-UP AND STEP-DOWN CONVERSION

BACKGROUND

Technical Field

The present disclosure relates to a power supply apparatus, and more particularly to a power supply apparatus with step-up and step-down conversion.

Description of Related Art

The statements in this section merely provide background information related to the present disclosure and do not necessarily constitute prior art.

In applications where the input power exceeds 75 watts, in order to meet the regulatory requirements for power factor (PF), a power factor correction (PFC) architecture is usually used. In general, a step-up (boost) converter is used to increase the power factor and maintain the output voltage at a fixed high-voltage output under different input voltages. For example, in applications with a wide range of input voltages of 90 to 264 volts, the power factor is improved through the step-up converter and the output voltage is maintained at a fixed voltage output of 390 volts. The fixed output voltage also provides good conditions for the next-level LLC architecture, thereby allowing the LLC to achieve the best efficiency gain design.

As the above-mentioned PFC as a first-level architecture plus a second-level LLC architecture, it is a very common power supply design architecture. However, with the popularity of PD (power delivery) models, the condition that the output voltage can be changed is applied to the LLC circuit architecture. Therefore, how to balance the gain and efficiency design has become an important issue in the design of LLC. That is, in order to improve the efficiency, it will lead to insufficient gain, while meeting the gain will cause the efficiency to decrease.

SUMMARY

An object of the present disclosure is to provide a power supply apparatus with step-up and step-down conversion to solve the problems of existing technology.

In order to achieve the above-mentioned object, the power supply apparatus with step-up and step-down conversion includes a primary-side rectifying/filtering circuit, a step-up converter, a full-bridge LLC converter, a primary-side controller, a secondary-side rectifying/filtering circuit, a voltage regulator, and a secondary-side controller. The primary-side rectifying/filtering circuit receives an AC input voltage, and rectifies and filters the AC input voltage into a DC input voltage. The step-up converter is coupled to the primary-side rectifying/filtering circuit, and receives the DC input voltage. The full-bridge LLC converter is coupled to the step-up converter. The primary-side controller is coupled to the step-up converter and the full-bridge LLC converter, and provides a step-up control signal to control the step-up converter to step up the DC input voltage into a step-up voltage, and provides a conversion control signal to control the full-bridge LLC converter to convert the step-up voltage into a conversion voltage according to at least one gain condition. The secondary-side rectifying/filtering circuit is coupled to the full-bridge LLC, and receives the conversion voltage, and rectifies and filters the conversion voltage into a DC output voltage. The voltage regulator is coupled to the secondary-side rectifying/filtering circuit. The secondary-side controller is coupled to the voltage regulator and the primary-side controller, and receives a power demand signal provided from a load, controls the primary-side controller to provide the step-up control signal and the conversion control signal according to the power demand signal, and provides a voltage regulation signal to control the voltage regulator so as to regulate the DC output voltage to an output voltage for supplying power to the load.

In one embodiment, the secondary-side controller provides a feedback control signal to the primary-side controller, wherein the feedback control signal includes a step-up conversion feedback control signal and a full-bridge LLC conversion feedback control signal. The primary-side controller adjusts the step-up control signal according to the step-up conversion feedback control signal, and adjusts the conversion control signal according to the full-bridge LLC conversion feedback control signal so as to adjust the at least one gain condition.

In one embodiment, the voltage regulator is a step-down converter. When the voltage regulation signal controls the step-down converter to operate in a step-down mode, the step-down converter steps down the DC output voltage to the output voltage, or when the voltage regulation signal controls the step-down converter to operate in a pass-through mode, the step-down converter passes through the DC output voltage as the output voltage, or when the voltage regulation signal controls the step-down converter to operate in an idle mode, and the step-down converter does nothing for the DC output voltage.

In one embodiment, the voltage regulator is a bypass circuit. The voltage regulation signal controls the bypass circuit to bypass the DC output voltage as the output voltage.

In one embodiment, the voltage regulator includes a step-down converter and a bypass circuit. When the voltage regulation signal controls the step-down converter to operate in a step-down mode, the step-down converter steps down the DC output voltage to the output voltage, or when the voltage regulation signal controls the step-down converter to operate in a pass-through mode, the step-down converter passes through the DC output voltage as the output voltage or controls the bypass circuit to bypass the DC output voltage as the output voltage, or when the voltage regulation signal controls the step-down converter and the bypass circuit to operate in an idle mode, the step-down converter and the bypass circuit do nothing for the DC output voltage.

In one embodiment, the step-down converter includes a switch coupled between the secondary-side rectifying/filtering circuit and the load. The voltage regulation signal controls the switch to be turned on so that the step-down converter operates in the pass-through mode to bypass the DC output voltage as the output voltage.

In one embodiment, the step-down converter includes a step-down conversion circuit. The voltage regulation signal controls the step-down conversion circuit so that the step-down converter operates in the step-down mode to step down the DC output voltage to the output voltage.

In one embodiment, the bypass circuit is an isolation switch.

In one embodiment, the step-up converter includes a step-up inductor, a step-up diode, a step-up capacitor, and a step-up control switch. A first end of the step-up inductor is coupled to the primary-side rectifying/filtering circuit. An anode of the step-up diode is coupled to a second end of the step-up inductor. A first end of the step-up capacitor is coupled to a cathode of the step-up diode, and a second end of the step-up capacitor is coupled to a reference potential.

A first end of the step-up control switch is coupled to the second end of the step-up inductor, a second end of the step-up control switch is coupled to the reference potential, and a control end of the step-up control switch receives the step-up control signal.

In one embodiment, the step-down converter includes a step-down control switch and a conversion circuit. A first end of the step-down control switch is coupled to the secondary-side rectifying/filtering circuit and receives the DC output voltage, and a control end of the step-down control switch receives the voltage regulation signal. The conversion circuit is coupled to a second end of the step-down control switch, and generates the output voltage according to a switch state of the step-down control switch.

In one embodiment, the full-bridge LLC converter includes a first switch, a second switch, a third switch, a fourth switch, a resonance capacitor, a first resonance inductor, and a second resonance inductor. A first end of the first switch is coupled to the step-up converter. A first end of the second switch is coupled to a second end of the first switch. A first end of the third switch is coupled to the secondary-side rectifying/filtering circuit. A first end of the fourth switch is coupled to a second end of the third switch. The first switch, the second switch, the third switch, and the fourth switch are controlled by the primary-side controller. The resonance capacitor, the first resonance inductor, and the second resonance inductor are connected in series to form a series-connected branch. A first end of the series-connected branch is coupled between the second end of the first switch and the first end of the second switch, and a second end of the series-connected branch is coupled between the second end of the third switch and the first end of the fourth switch.

In one embodiment, when the third switch is turned off and the fourth switch is turned on, the second resonance inductor generates a resonance operation, and the series-connected branch is coupled between the first end of the second switch and the second end of the second switch.

In one embodiment, when the DC output voltage is less than a voltage setting value, the third switch is turned off and the fourth switch is turned on.

In one embodiment, the secondary-side controller feeds back signals to the primary-side controller through an optical coupling isolation.

Accordingly, the output voltage can be flexibly adjusted (changed) while taking into account a higher voltage gain and better conversion efficiency by the proposed power supply apparatus with step-up and step-down conversion according to the present disclosure.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
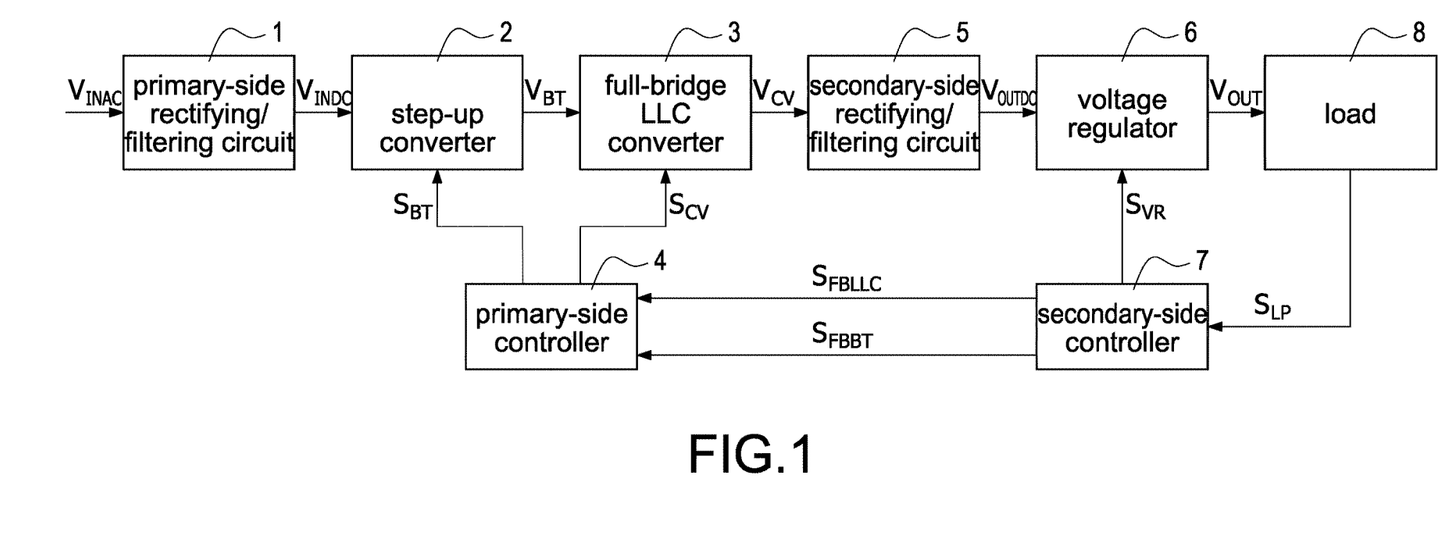
FIG. 1 is a block diagram of a power supply apparatus with step-up and step-down conversion according to the present disclosure.

Please refer to FIG. 1, which shows a block diagram of a power supply apparatus with step-up and step-down conversion according to the present disclosure. The power supply apparatus with step-up and step-down conversion includes a primary-side rectifying/filtering circuit 1, a step-up converter 2, a full-bridge LLC converter 3, a primary-side controller 4, a secondary-side rectifying/filtering circuit 5, a voltage regulator 6, and a secondary-side controller 7.

Figure 5:
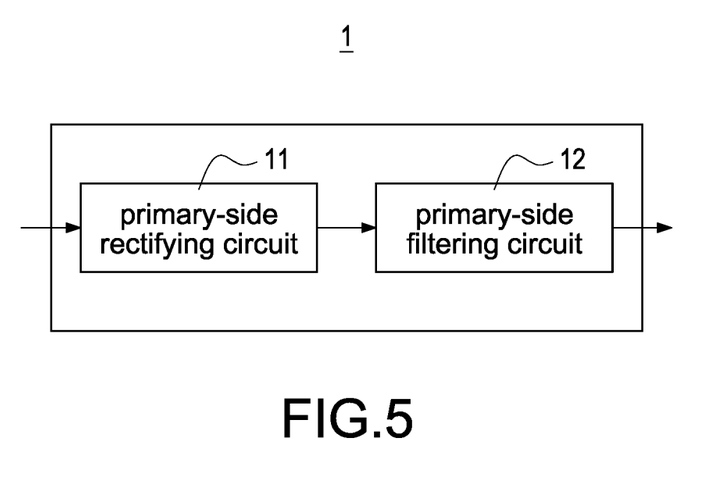
FIG. 5 is a block diagram of a primary-side rectifying/filtering circuit according to the present disclosure.

The primary-side rectifying/filtering circuit 1 receives an AC input voltage $V_{INAC}$, and rectifies and filters the AC input voltage $V_{INAC}$ into a DC input voltage $V_{INDC}$. Please refer to FIG. 5, which shows a block diagram of a primary-side rectifying/filtering circuit according to the present disclosure. As shown in FIG. 5, the primary-side rectifying/filtering circuit 1 includes a primary-side rectifying circuit 11 and a primary-side filtering circuit 12. The primary-side rectifying circuit 11 is used to rectify the AC input voltage $V_{INAC}$. The primary-side filtering circuit 12 is sued to filter the rectified AC input voltage $V_{INDC}$ to output the DC input voltage $V_{INDC}$ to the step-up converter 2.

Figure 4:
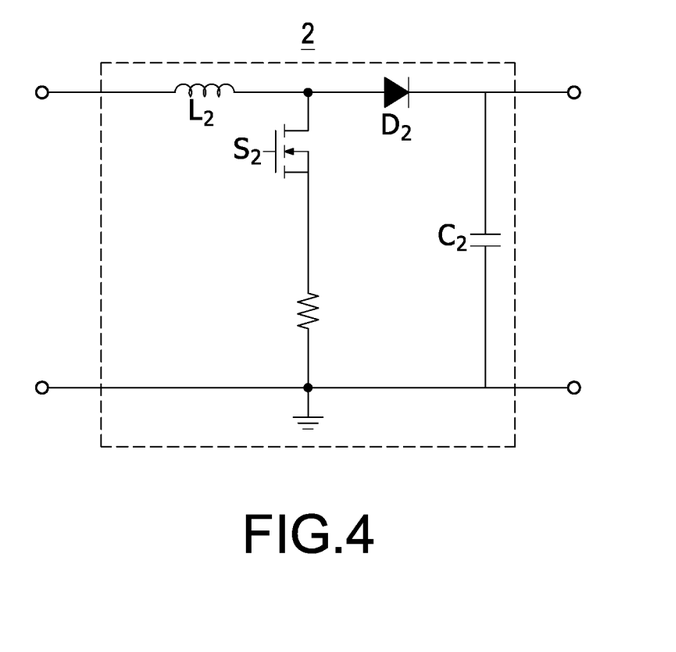
FIG. 4 is a circuit diagram of a step-up converter according to the present disclosure.

Please refer to FIG. 1 again, the step-up converter 2 is coupled to the primary-side rectifying/filtering circuit 1, and receives the DC input voltage $V_{INDC}$. Please refer to FIG. 4, which shows a circuit diagram of a step-up converter according to the present disclosure. As shown in FIG. 4, the step-up converter 2 includes a step-up inductor $L_2$, a step-up diode $D_2$, a step-up capacitor $C_2$, and a step-up control switch $S_2$. A first end of the step-up inductor $L_2$ is coupled to the primary-side rectifying/filtering circuit 1, i.e., the primary-side filtering circuit 12 of the primary-side rectifying/filtering circuit 1. An anode of the step-up diode $D_2$ is coupled to a second end of the step-up inductor $L_2$. A first end of the step-up capacitor $C_2$ is coupled to a cathode of the step-up diode $D_2$, and a second end of the step-up capacitor $C_2$ is coupled to a reference potential (such as, a grounding potential). In particular, an output voltage between the first end and second end of the step-up capacitor $C_2$ is the stepped-up DC input voltage $V_{INDC}$. A first end of the step-up control switch $S_2$ is coupled to the second end of the step-up inductor $L_2$ and the anode of the step-up diode $D_2$, a second end of the step-up control switch $S_2$ is coupled to the reference potential, and a control end of the step-up control switch $S_2$ receives a step-up control signal $S_{BT}$. In particular, the step-up control switch $S_2$ is turned on and turned off by the step-up control signal $S_{BT}$ with a duty cycle to determine an amplitude of the stepped-up DC input voltage $V_{INDC}$.

Figure 3:
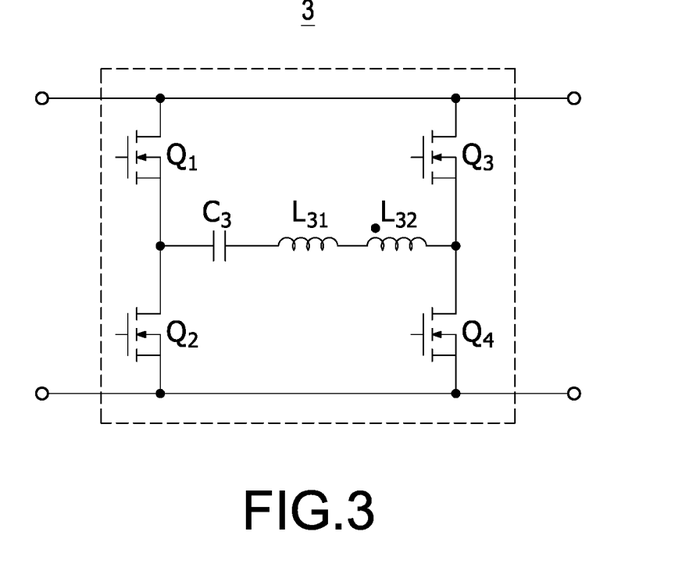
FIG. 3 is a circuit diagram of a full-bridge LLC converter according to the present disclosure.

The full-bridge LLC converter 3 is coupled to the step-up converter 2. Please refer to FIG. 3, which shows a circuit diagram of a full-bridge LLC converter according to the present disclosure. As shown in FIG. 3, the full-bridge LLC converter 3 includes a first switch $Q_1$, a second switch $Q_2$, a third switch $Q_3$, a fourth switch $Q_4$, a resonance capacitor $C_3$, a first resonance inductor $L_{31}$, and a second resonance inductor $L_{32}$. A first end of the first switch $Q_1$ is coupled to the step-up converter 2. A first end of the second switch $Q_2$ is coupled to a second end of the first switch $Q_1$. A first end of the third switch $Q_3$ is coupled to the secondary-side rectifying/filtering circuit 5. A first end of the fourth switch $Q_4$ is coupled to a second end of the third switch $Q_3$. The first switch $Q_1$, the second switch $Q_2$, the third switch $Q_3$, and the fourth switch $Q_4$ are controlled by the primary-side controller 4. The resonance capacitor $C_3$, the first resonance inductor $L_{31}$, and the second resonance inductor $L_{32}$ are connected in series to form a series-connected branch. A first end of the series-connected branch is coupled between the second end of the first switch $Q_1$ and the first end of the second switch $Q_2$, and a second end of the series-connected branch is coupled between the second end of the third switch $Q_3$ and the first end of the fourth switch $Q_4$.

When the full-bridge LLC converter 3 operates in a half-bridge mode, the third switch $Q_3$ is turned off and the fourth switch $Q_4$ is continuously turned on. In this condition, the second resonance inductor $L_{32}$ generates a resonance operation, and the series-connected branch (composed of the resonance capacitor $C_3$, the first resonance inductor $L_{31}$, and the second resonance inductor $L_{32}$) is coupled between the first end of the second switch $Q_2$ and the second end of the second switch $Q_2$.

The primary-side controller 4 is coupled to the step-up converter 2 and the full-bridge LLC converter 3, and provides a step-up control signal $S_{BT}$ to control the step-up converter 2 to step up the DC input voltage $V_{INDC}$ into the step-up voltage $V_{BT}$, and provide a conversion control signal $S_{CV}$ to control the full-bridge LLC converter 3 to convert the step-up voltage $V_{BT}$ into a conversion voltage $V_{CV}$ according to at least one gain condition.

Figure 6:
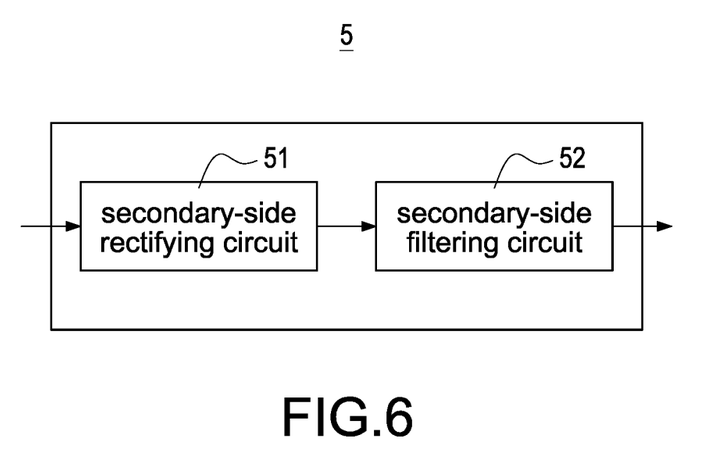
FIG. 6 is a block diagram of a secondary-side rectifying/filtering circuit according to the present disclosure.
Figure 7:
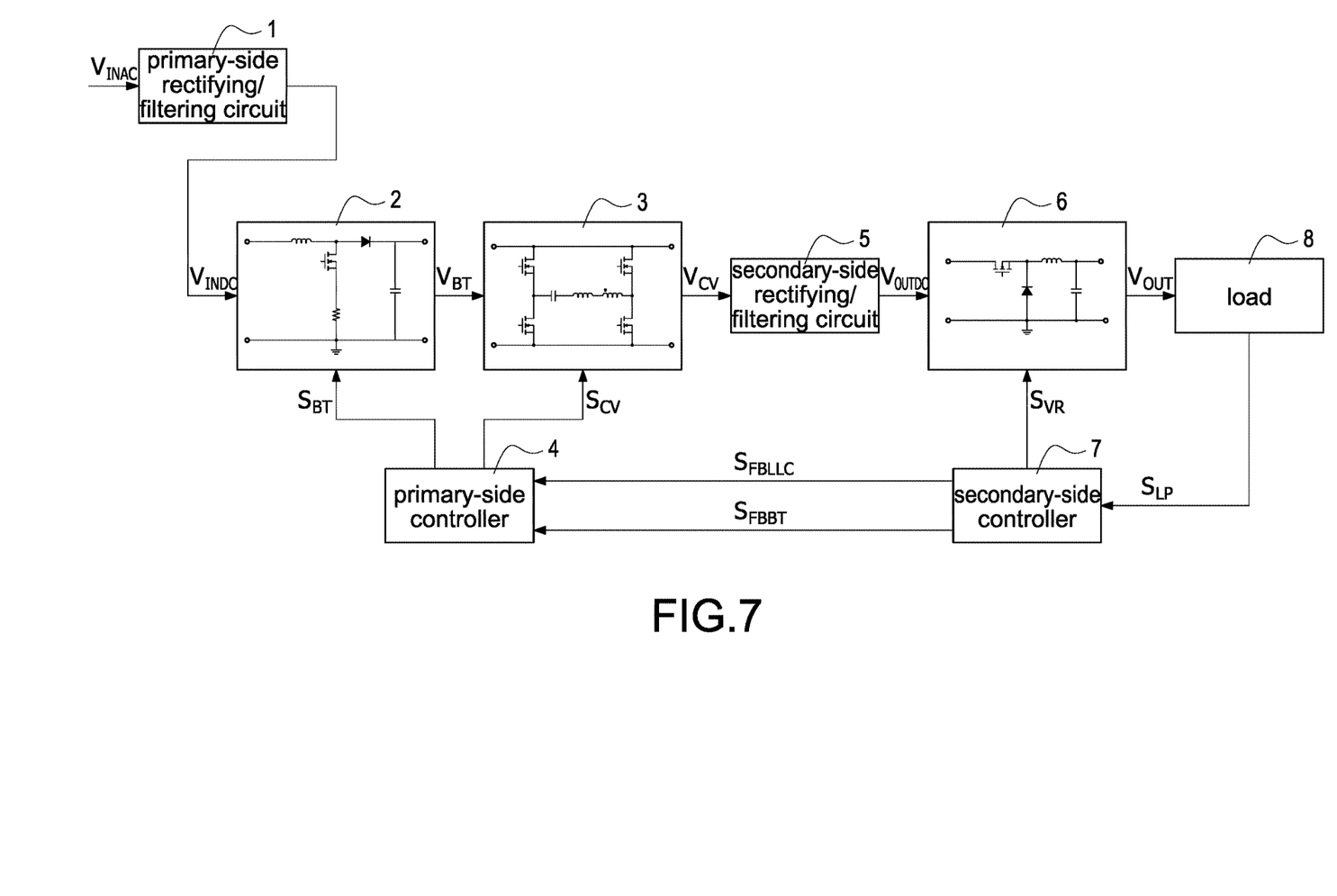
FIG. 7 is a detailed block circuit diagram of the power supply apparatus with step-up and step-down conversion according to the present disclosure.

The secondary-side rectifying/filtering circuit 5 is coupled to the full-bridge LLC 3, and receives the conversion voltage $V_{CV}$, and rectifies and filters the conversion voltage $V_{CV}$ into the DC output voltage $V_{OUTDC}$. Please refer to FIG. 6, which shows a block diagram of a secondary-side rectifying/filtering circuit according to the present disclosure. As shown in FIG. 6, the secondary-side rectifying/filtering circuit 5 includes a secondary-side rectifying circuit 51 and a secondary-side filtering circuit 52. The secondary-side rectifying circuit 51 is used to rectify the conversion voltage $V_{CV}$. The secondary-side filtering circuit 52 is sued to filter the rectified conversion voltage $V_{CV}$ to output the DC output voltage $V_{OUTDC}$ to the voltage regulator 6.

The voltage regulator 6 is coupled to the secondary-side rectifying/filtering circuit 5. Please refer to FIG. 2A, which shows a circuit diagram of a voltage regulator according to a first embodiment of the present disclosure. In the first embodiment, the voltage regulator 6 is a step-down converter 61. The step-down converter 61 includes a step-down control switch $S_6$ and a conversion circuit $CIR_6$. A first end of the step-down control switch $S_6$ is coupled to the secondary-side rectifying/filtering circuit 5 and receives the DC output voltage $V_{OUTDC}$, and a control end of the step-down control switch $S_6$ receives a voltage regulation signal $S_{VR}$. The conversion circuit $CIR_6$ is coupled to a second end of the step-down control switch $S_6$, and generates the output voltage $V_{OUT}$ according to a switch state of the step-down control switch $S_6$.

Figure 2A:
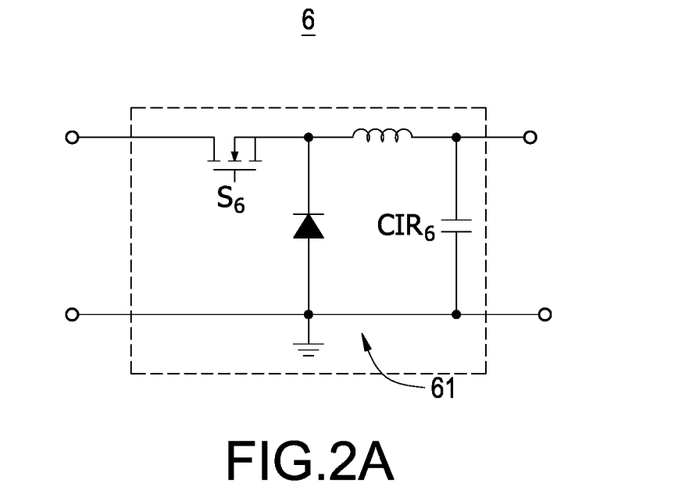
FIG. 2A is a circuit diagram of a voltage regulator according to a first embodiment of the present disclosure.
Figure 2B:
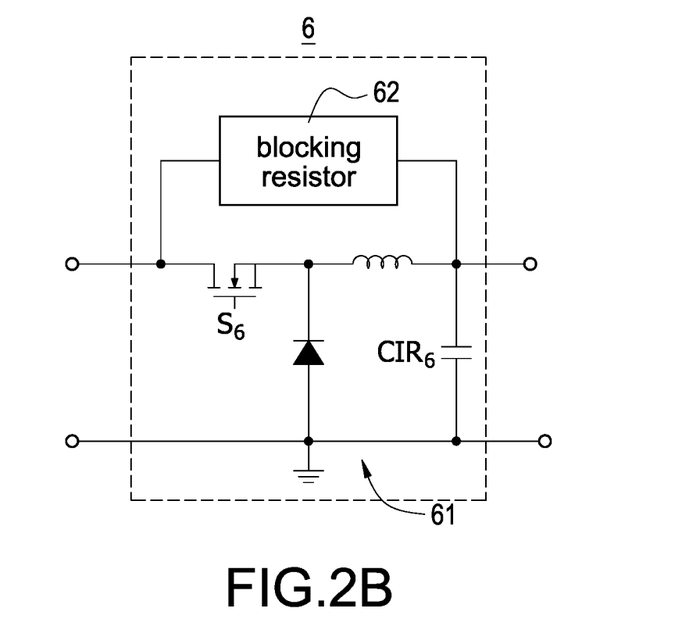
FIG. 2B is a block circuit diagram of the voltage regulator according to a second embodiment of the present disclosure.

Please refer to FIG. 2B, which shows a block circuit diagram of the voltage regulator according to a second embodiment of the present disclosure. In this second embodiment, the voltage regulator 6 includes a step-down converter 61 and a bypass circuit 62. The step-down converter 61 is the same as that shown in FIG. 2A, and will not be described again. The bypass circuit 62 is a blocking circuit 62 or an isolation switch, which is coupled between the first end of the step-down control switch $S_6$ and an output side of the conversion circuit $CIR_6$.

When the voltage regulator 6 is the step-down converter 61 and the voltage regulation signal $S_{VR}$ controls the step-down converter 61 to operate in a step-down mode, the step-down converter 61 steps down the DC output voltage $V_{OUTDC}$ to the output voltage $V_{OUT}$. Alternatively, when the voltage regulator 6 is the step-down converter 61 and the voltage regulation signal $S_{VR}$ controls the step-down converter 61 to operate in a pass-through mode, the step-down converter 61 passes through the DC output voltage $V_{OUTDC}$ as the output voltage $V_{OUT}$. Alternatively, when the voltage regulator 6 is the step-down converter 61 and the voltage regulation signal $S_{VR}$ controls the step-down converter 61 to operate in an idle mode, the step-down converter 61 does nothing for the DC output voltage $V_{OUTDC}$.

When the voltage regulator 6 is the bypass circuit 62, the voltage regulation signal $S_{VR}$ controls the bypass circuit 62 to bypass the DC output voltage $V_{OUTDC}$ as the output voltage $V_{OUT}$.

When the voltage regulator 6 is the step-down converter 61 and the bypass circuit 62, and the voltage regulation signal $S_{VR}$ controls the step-down converter 61 to operate in a step-down mode, the step-down converter 61 steps down the DC output voltage $V_{OUTDC}$ to the output voltage $V_{OUT}$. Alternatively, when the voltage regulator 6 is the step-down converter 61 and the bypass circuit 62, and the voltage regulation signal $S_{VR}$ controls the step-down converter 61 to operate in a pass-through mode, the step-down converter 61 passes through the DC output voltage $V_{OUTDC}$ as the output voltage $V_{OUT}$. Alternatively, when the voltage regulator 6 is the step-down converter 61 and the bypass circuit 62, and the voltage regulation signal $S_{VR}$ controls the step-down converter 61 to operate in an idle mode, the step-down converter 61 and the bypass circuit 62 do nothing for the DC output voltage $V_{OUTDC}$.

In one embodiment, the step-down converter 61 includes a switch coupled between the secondary-side rectifying/filtering circuit 5 and a load 8. The voltage regulation signal $S_{VR}$ controls the switch to be turned on so that the step-down converter 61 operates in the pass-through mode to bypass the DC output voltage $V_{OUTDC}$ as the output voltage $V_{OUT}$.

In one embodiment, the step-down converter 61 includes a step-down conversion circuit. The voltage regulation signal $S_{VR}$ controls the step-down conversion circuit so that the step-down converter 61 operates in the step-down mode to step down the DC output voltage $V_{OUTDC}$ to the output voltage $V_{OUT}$.

The secondary-side controller 7 is coupled to the voltage regulator 6 and the primary-side controller 4. The secondary-side controller 7 receives a power demand signal $S_{LP}$ provided from the load 8, controls the primary-side controller 4 to provide the step-up control signal $S_{BT}$ and the conversion control signal $S_{CV}$ according to the power demand signal $S_{LP}$, and provide a voltage regulation signal $S_{VR}$ to control the voltage regulator 6 so as to regulate the DC output voltage $V_{OUTDC}$ w to an output voltage $V_{OUT}$ for supplying power to the load 8.

As shown in FIG. 1, the secondary-side controller 7 provides a feedback control signal to the primary-side controller 4, wherein the feedback control signal includes a step-up conversion feedback control signal $S_{FBBT}$ and a full-bridge LLC conversion feedback control signal $S_{FBLLC}$. The primary-side controller 4 adjusts the step-up control signal $S_{BT}$ according to the step-up conversion feedback control signal $S_{FBBT}$, and adjusts the conversion control signal $S_{CV}$ according to the full-bridge LLC conversion feedback control signal $S_{FBLLC}$ so as to adjust the at least one gain condition.

Hereinafter, the operation of the power supply apparatus with step-up and step-down conversion of the present disclosure will be explained based on FIG. 1 and the exemplified voltage values exemplified. First, take a 240-watt power supply apparatus (adapter) as an example, which provides a single output voltage of 20 volts and an output current of 12 amperes, and a turns ratio (voltage conversion ratio) of the full-bridge LLC converter 3 is 20:2, and a gain ratio of the voltage regulator 6 is 1:1. When the output voltage (i.e., the step-up voltage $V_{BT}$) of the step-up converter 2 is 400 volts, the output voltage (i.e., the conversion voltage $V_{CV}$) of the full-bridge LLC converter 3 is 20 volts, and the output voltage (i.e., the output voltage $V_{OUT}$) of the voltage regulator 6 is 20 volts.

In the present disclosure, the output voltage $V_{OUT}$ of 20 volts is based and shown in the third column of Table 1. When the output voltage $V_{OUT}$ wants to be adjusted to be greater than 20 volts (such as 28 volts, 36 volts, 48 volts, etc.) or less than or equal to 20 volts (such as 15 volts, 9 volts, 5 volts, etc.), the full-bridge LLC converter 3 is controlled (switched) to implement the voltage adjustment. For example, when the output voltage $V_{OUT}$ wants to be adjusted to be greater than 20 volts, the full-bridge LLC converter 3 is controlled to operate in a full-bridge mode; when the output voltage $V_{OUT}$ wants to be adjusted to be less than or equal to 20 volts, the full-bridge LLC converter 3 is controlled to operate in a half-bridge mode, the detailed description will be made as follows. Similarly, according to the adjustment of the turns ratio of the full-bridge LLC converter 3 and the gain ratio of the voltage regulator 6, the step-up voltage $V_{BT}$ (i.e., the output voltage of the step-up converter 2) may be converted into the required output voltage $V_{OUT}$ (i.e., the output voltage of the voltage regulator 6) as shown in Table 1.

Take the fourth column of Table 1 as an example, if it is desired to adjust the output voltage $V_{OUT}$ to 15 volts, and in order to maintain the voltage gain of the voltage regulator 6, the secondary-side controller 7 (such as a PD IC) controls the voltage gain of the voltage regulator 6 to be 1:1 (that is, the voltage regulator 6 operates in a pass-through mode) by the voltage regulation signal $S_{VR}$, steps down the output voltage of the step-up converter 2 to be 300 volts by the step-up control signal $S_{BT}$, and maintains the turns ratio of the full-bridge LLC converter 3 to be 20:2 (that is, the full-bridge LLC converter 3 operates in a half-bridge mode) by the conversion control signal $S_{CV}$ so as to adjust the output voltage $V_{OUT}$ to be 15 volts, thereby achieving better conversion efficiency and taking into account the gain design.

Take the fifth column of Table 1 as an example, if it is desired to adjust the output voltage $V_{OUT}$ to 9 volts, and in order to maintain the step-up voltage $V_{BT}$ (i.e., the voltage of the capacitor $C_2$) no longer decreases, the secondary-side controller 7 maintains the turns ratio of the full-bridge LLC converter 3 to be 20:2 (that is, the full-bridge LLC converter 3 operates in the half-bridge mode) by the conversion control signal $S_{CV}$, and controls the voltage gain of the voltage regulator 6 to be 5:3 (that is, the voltage regulator 6 operates in a step-down mode) by the voltage regulation signal $S_{VR}$.

Take the sixth column of Table 1 as an example, if it is desired to adjust the output voltage $V_{OUT}$ to 5 volts, and in order to maintain the step-up voltage $V_{BT}$ (i.e., the voltage of the capacitor $C_2$) no longer decreases, the secondary-side controller 7 maintains the turns ratio of the full-bridge LLC converter 3 to be 20:2 (that is, the full-bridge LLC converter 3 operates in the half-bridge mode) by the conversion control signal $S_{CV}$, and controls the voltage gain of the voltage regulator 6 to be 3:1 (that is, the voltage regulator 6 operates in the step-down mode) by the voltage regulation signal $S_{VR}$.

Incidentally, in the above embodiments, if the gain ratio through the voltage regulator 6 is 4:1, it is not infeasible to reduce the conversion voltage $V_{CV}$ from 20 volts to 5 volts. However, for the consideration of conversion efficiency, this method of power conversion is less adopted.

Therefore, by designing the boost voltage $V_{BT}$ to 300 volts and maintaining the turns ratio of the full-bridge LLC converter 3 to be 20:2, only through the step-down mode of controlling the gain ratio of the voltage regulator 6, the output voltage $V_{OUT}$ of 9 volts or 5 volts may be acquired. Accordingly, the output voltage can be flexibly adjusted (changed) while taking into account a higher voltage gain and better conversion efficiency.

Furthermore, when the output voltage $V_{OUT}$ wants to be adjusted to be greater than 20 volts (such as 28 volts, 36 volts, 48 volts, etc.), if the full-bridge LLC converter 3 operates in the half-bridge mode, it is necessary to significantly increase the step-up voltage $V_{BT}$ (i.e., the output voltage of the step-up converter 2), which results in restrictions and considerations in the voltage withstand design of components and the increase in cost.

Take the second column of Table 1 as an example, if it is desired to adjust the output voltage $V_{OUT}$ to 28 volts, and in order to maintain the voltage gain of the voltage regulator 6, the secondary-side controller 7 controls the voltage gain of the voltage regulator 6 to be 1:1 (that is, the voltage regulator 6 operates in the pass-through mode) by the voltage regulation signal $S_{VR}$, steps up the output voltage of the step-up converter 2 to be 280 volts by the step-up control signal $S_{BT}$, and maintains the turns ratio of the full-bridge LLC converter 3 to be 20:2 (that is, the full-bridge LLC converter 3 operates in a full-bridge mode) by the conversion control signal $S_{CV}$ so as to adjust the output voltage $V_{OUT}$ to be 28 volts, thereby achieving better conversion efficiency and taking into account the gain design.

Take the first column of Table 1 as an example, if it is desired to adjust the output voltage $V_{OUT}$ to 48 volts, and in order to increase the step-up voltage $V_{BT}$ at an acceptable voltage level, the secondary-side controller 7 maintains the turns ratio of the full-bridge LLC converter 3 to be 20:2 (that is, the full-bridge LLC converter 3 operates in the full-bridge mode) by the conversion control signal $S_{CV}$, and controls the voltage gain of the voltage regulator 6 to be 1:1 (that is, the voltage regulator 6 operates in the pass-through mode) by the voltage regulation signal $S_{VR}$.

Incidentally, when the output voltage $V_{OUT}$ is greater than or equal to 20 volts, according to the present PD regulations, the power supply apparatus usually has an output power of 240 watts. If the step-down converter cannot withstand such a high output wattage, the voltage regulator 6 may further include a bypass circuit 62, wherein the bypass circuit may be a blocking resistor as a switch. Therefore, when the output voltage is high enough (too) high, the DC output voltage $V_{OUTDC}$ is passed through as the output voltage $V_{OUT}$ (that is, the DC output voltage $V_{OUTDC}$ is not provided through the step-down converter) by the conduction of the blocking resistor, which is equivalent to the effect of voltage gain of 1, thereby achieving the benefit of protecting the voltage regulator 6.

In summary, based on the output voltage $V_{OUT}$ of 20 volts, the design the voltage gain value with the best efficiency can be implemented. When it wants to adjust the output voltage $V_{OUT}$ to decrease, the output voltage (i.e., the step-up voltage $V_{BT}$) of the step-up converter 2 and/or the output voltage (i.e., the conversion voltage $V_{CV}$) of the full-bridge LLC converter 3 may be adjusted to maintain the voltage gain value for the best efficiency (i.e., operating the voltage regulator 6 in the pass-through mode), and the full-bridge LLC converter 3 operates in the half-bridge mode. If the system needs a lower output voltage $V_{OUT}$, the voltage regulator 6 may be operated in the step-down mode to achieve the lower voltage required by the system load.

Furthermore, when it wants to adjust the output voltage $V_{OUT}$ to be higher than 20 volts, the full-bridge LLC converter 3 may be operated in the full-bridge mode to acquire a circuit behavior of twice the gain to maintain the voltage gain value for the best efficiency (i.e., operating the voltage regulator 6 in the pass-through mode) so that an excessively high b step-up voltage $V_{BT}$ can be avoided, and a sufficiently high output voltage $V_{OUT}$ can be outputted. Furthermore, if it is considered that the step-down converter cannot withstand the high output wattage, the voltage regulator 6 may further include a bypass circuit 62 to directly pass the DC output voltage $V_{OUTDC}$ as the output voltage $V_{OUT}$ (that is, the DC output voltage $V_{OUTDC}$ is not provided through the step-down converter), thereby achieving the benefit of protecting the voltage regulator 6.

TABLE 1

| step-up voltage $V_{BT}$ (volts) | turns ratio of full-bridge LLC converter 3 | conversion voltage $V_{CV}$ (volts) | gain ration of voltage regulator 6 | output voltage $V_{OUT}$ (volts) |
|---|---|---|---|---|
| 480 | 20:2 (full-bridge mode) | 48 | 1:1 (pass-through mode) | 48 |
| 280 | 20:2 (full-bridge mode) | 28 | 1:1 (pass-through mode) | 28 |
| 400 | 20:2 (half-bridge mode) | 20 | 1:1 (pass-through mode) | 20 |
| 300 | 20:2 (half-bridge mode) | 15 | 1:1 (pass-through mode) | 15 |
| 300 | 20:2 (half-bridge mode) | 15 | 5:3 (step-down mode) | 9 |
| 300 | 20:2 (half-bridge mode) | 15 | 3:1 (step-down mode) | 5 |

In conclusion, the output voltage can be flexibly adjusted (changed) while taking into account a higher voltage gain and better conversion efficiency by the proposed power supply apparatus with step-up and step-down conversion according to the present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply apparatus with step-up and step-down conversion, comprising:
   a primary-side rectifying/filtering circuit, configured to receive an AC input voltage, and rectify and filter the AC input voltage into a DC input voltage,
   a step-up converter, coupled to the primary-side rectifying/filtering circuit, and configured to receive the DC input voltage,
   a full-bridge LLC converter, coupled to the step-up converter,
   a primary-side controller, coupled to the step-up converter and the full-bridge LLC converter, and configured to provide a step-up control signal to control the step-up converter to step up the DC input voltage into a step-up voltage, and provide a conversion control signal to control the full-bridge LLC converter to convert the step-up voltage into a conversion voltage according to at least one gain condition,
   a secondary-side rectifying/filtering circuit, coupled to the full-bridge LLC, and configured to receive the conversion voltage, and rectify and filter the conversion voltage into a DC output voltage,
   a voltage regulator, coupled to the secondary-side rectifying/filtering circuit, and
   a secondary-side controller, coupled to the voltage regulator and the primary-side controller, and configured to receive a power demand signal provided from a load, control the primary-side controller to provide the step-up control signal and the conversion control signal according to the power demand signal, and provide a voltage regulation signal to control the voltage regulator so as to regulate the DC output voltage to an output voltage for supplying power to the load,
   wherein the secondary-side controller provides a feedback control signal to the primary-side controller, wherein the feedback control signal comprises a step-up conversion feedback control signal and a full-bridge LLC conversion feedback control signal,
   wherein the primary-side controller adjusts the step-up control signal according to the step-up conversion feedback control signal, and adjusts the conversion control signal according to the full-bridge LLC conversion feedback control signal so as to adjust the at least one gain condition.

2. The power supply apparatus with step-up and step-down conversion as claimed in claim 1, wherein the voltage regulator is a step-down converter, wherein the step-down is configured to operate in any of the following different operation modes based on the voltage regulation signal,
   when the voltage regulation signal controls the step-down converter to operate in a step-down mode, the step-down converter steps down the DC output voltage to the output voltage, or
   when the voltage regulation signal controls the step-down converter to operate in a pass-through mode, the step-down converter passes through the DC output voltage as the output voltage, or
   when the voltage regulation signal controls the step-down converter to operate in an idle mode, and the step-down converter does nothing for the DC output voltage.

3. The power supply apparatus with step-up and step-down conversion as claimed in claim 1, wherein the voltage regulator is a bypass circuit, the voltage regulation signal controls the bypass circuit to bypass the DC output voltage as the output voltage.

4. The power supply apparatus with step-up and step-down conversion as claimed in claim 1, wherein the voltage regulator comprises a step-down converter and a bypass circuit,
when the voltage regulation signal controls the step-down converter to operate in a step-down mode, the step-down converter steps down the DC output voltage to the output voltage, or
when the voltage regulation signal controls the step-down converter to operate in a pass-through mode, the step-down converter passes through the DC output voltage as the output voltage or controls the bypass circuit to bypass the DC output voltage as the output voltage, or
when the voltage regulation signal controls the step-down converter and the bypass circuit to operate in an idle mode, the step-down converter and the bypass circuit do nothing for the DC output voltage.

5. The power supply apparatus with step-up and step-down conversion as claimed in claim 2, wherein the step-down converter comprises a switch coupled between the secondary-side rectifying/filtering circuit and the load,
the voltage regulation signal controls the switch to be turned on so that the step-down converter operates in the pass-through mode to bypass the DC output voltage as the output voltage.

6. The power supply apparatus with step-up and step-down conversion as claimed in claim 4, wherein the step-down converter comprises a switch coupled between the secondary-side rectifying/filtering circuit and the load,
the voltage regulation signal controls the switch to be turned on so that the step-down converter operates in the pass-through mode to bypass the DC output voltage as the output voltage.

7. The power supply apparatus with step-up and step-down conversion as claimed in claim 2, wherein the step-down converter comprises a step-down conversion circuit,
the voltage regulation signal controls the step-down conversion circuit so that the step-down converter operates in the step-down mode to step down the DC output voltage to the output voltage.

8. The power supply apparatus with step-up and step-down conversion as claimed in claim 4, wherein the step-down converter comprises a step-down conversion circuit,
the voltage regulation signal controls the step-down conversion circuit so that the step-down converter operates in the step-down mode to step down the DC output voltage to the output voltage.

9. The power supply apparatus with step-up and step-down conversion as claimed in claim 3, wherein the bypass circuit is an isolation switch.

10. The power supply apparatus with step-up and step-down conversion as claimed in claim 4, wherein the bypass circuit is an isolation switch.

11. The power supply apparatus with step-up and step-down conversion as claimed in claim 1, wherein the step-up converter comprises:
a step-up inductor, a first end of the step-up inductor coupled to the primary-side rectifying/filtering circuit,
a step-up diode, an anode of the step-up diode coupled to a second end of the step-up inductor,
a step-up capacitor, a first end of the step-up capacitor coupled to a cathode of the step-up diode, and a second end of the step-up capacitor coupled to a reference potential, and
a step-up control switch, a first end of the step-up control switch coupled to the second end of the step-up inductor, a second end of the step-up control switch coupled to the reference potential, and a control end of the step-up control switch configured to receive the step-up control signal.

12. The power supply apparatus with step-up and step-down conversion as claimed in claim 2, wherein the step-down converter comprises:
a step-down control switch, a first end of the step-down control switch coupled to the secondary-side rectifying/filtering circuit and configured to receive the DC output voltage, and a control end of the step-down control switch configured to receive the voltage regulation signal, and
a conversion circuit, coupled to a second end of the step-down control switch, and configured to generate the output voltage according to a switch state of the step-down control switch.

13. The power supply apparatus with step-up and step-down conversion as claimed in claim 4, wherein the step-down converter comprises:
a step-down control switch, a first end of the step-down control switch coupled to the secondary-side rectifying/filtering circuit and configured to receive the DC output voltage, and a control end of the step-down control switch configured to receive the voltage regulation signal, and
a conversion circuit, coupled to a second end of the step-down control switch, and configured to generate the output voltage according to a switch state of the step-down control switch.

14. The power supply apparatus with step-up and step-down conversion as claimed in claim 1, wherein the full-bridge LLC converter comprises:
a first switch, a first end of the first switch coupled to the step-up converter,
a second switch, a first end of the second switch coupled to a second end of the first switch,
a third switch, a first end of the third switch coupled to the secondary-side rectifying/filtering circuit,
a fourth switch, a first end of the fourth switch coupled to a second end of the third switch, wherein the first switch, the second switch, the third switch, and the fourth switch are controlled by the primary-side controller, and
a resonance capacitor, a first resonance inductor, and a second resonance inductor, connected in series to form a series-connected branch,
wherein a first end of the series-connected branch is coupled between the second end of the first switch and the first end of the second switch, and a second end of the series-connected branch is coupled between the second end of the third switch and the first end of the fourth switch.

15. The power supply apparatus with step-up and step-down conversion as claimed in claim 14, wherein when the third switch is turned off and the fourth switch is turned on, the second resonance inductor generates a resonance operation, and the series-connected branch is coupled between the first end of the second switch and the second end of the second switch.

16. The power supply apparatus with step-up and step-down conversion as claimed in claim 15, wherein when the DC output voltage is less than a voltage setting value, the third switch is turned off and the fourth switch is turned on.

17. The power supply apparatus with step-up and step-down conversion as claimed in claim 1, wherein the secondary-side controller feeds back signals to the primary-side controller through an optical coupling isolation.

\* \* \* \* \*